（12）United States Patent
Jones et al.

(10) Patent No.: US 6,595,117 B1
(45) Date of Patent: Jul. 22, 2003

(54) HIGH SPEED VARIABLE SIZE TOASTER

(75) Inventors: Douglas Jones, Port Richey, FL (US); William Day, New Port Richey, FL (US); David Harter, New Port Richey, FL (US); Gerald W. Sank, Palm Harbor, FL (US); Paul Molloy, Palm Harbor, FL (US)

(73) Assignee: The Frymaster Corporation, Shreveport, LA (US)

( * ) Notice: Subject to any disclaimer, the term of this patent is extended or adjusted under 35 U.S.C. 154(b) by 0 days.

(21) Appl. No.: 09/632,417

(22) Filed: Aug. 4, 2000

Related U.S. Application Data
(60) Provisional application No. 60/147,119, filed on Aug. 4, 1999.

(51) Int. Cl.[7] ............................. A47J 37/08; A23L 1/00
(52) U.S. Cl. ............................. 99/386; 99/388; 99/391; 99/477
(58) Field of Search ........................... 99/386, 388, 391, 99/389, 477

(56) References Cited

U.S. PATENT DOCUMENTS

| | | | |
|---|---|---|---|
| 3,736,860 A | 6/1973 | Vischer, Jr. ................... 99/339 |
| 4,556,043 A | 12/1985 | Bratton ..................... 126/21 A |
| 4,739,154 A | 4/1988 | Bharara et al. ............. 219/388 |
| 4,753,215 A | * 6/1988 | Kaminski et al. ......... 99/477 X |
| 4,873,107 A | 10/1989 | Archer ....................... 426/520 |
| 4,951,648 A | 8/1990 | Shukla et al. ............. 126/21 A |
| 5,033,366 A | * 7/1991 | Sullivan ...................... 99/352 |
| 5,077,072 A | * 12/1991 | Sieradzki .................. 99/386 X |
| 5,239,917 A | * 8/1993 | Lutkie et al. ............. 99/386 X |
| 5,983,785 A | 11/1999 | Schreiner et al. ............. 99/386 |
| 6,192,877 B1 | 2/2001 | Moshonas et al. ........ 126/21 A |

FOREIGN PATENT DOCUMENTS

DE      42 39 620      3/1994

* cited by examiner

Primary Examiner—Reginald L. Alexander
(74) Attorney, Agent, or Firm—Ohlandt, Greeley, Ruggiero & Perle, LLP

(57) ABSTRACT

A cooking appliance which is capable of rapidly toasting a food product disposed therein by air impingement and infrared heating to provide a cooked food product having the desired color and crunchiness about its surface. The appliance is particularly adapted for cooking sandwich products, toasting the bread and heating the sandwich filler. The appliance includes an air impingement assembly that delivers columns of heated air to the food product and an infrared heater assembly that produces infrared energy. The appliance delivers the impingement air from above the food product and the infrared energy from below. Alternatively, the appliance delivers the impingement air from above and below the food product and the infrared energy from below.

19 Claims, 7 Drawing Sheets

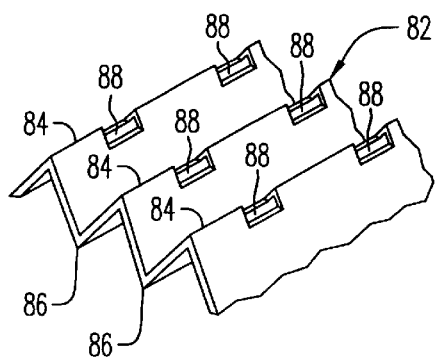
FIG. 5
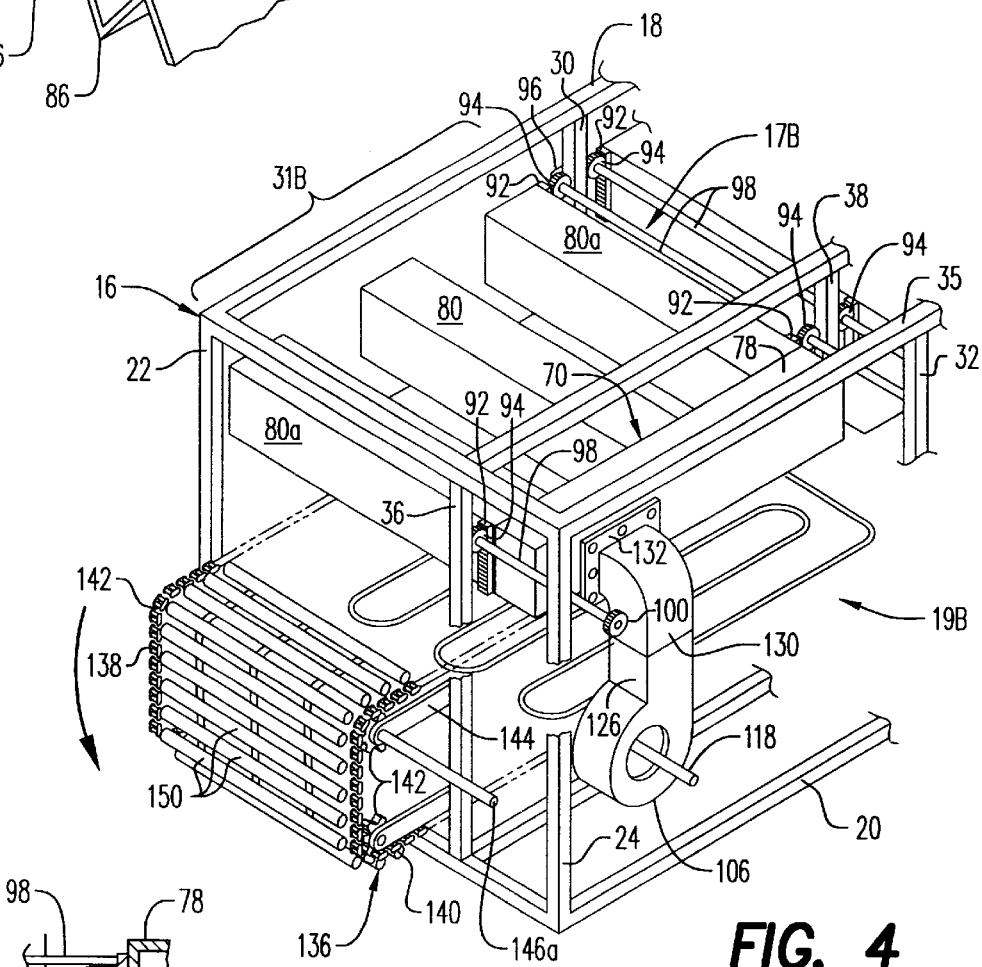
FIG. 4
FIG. 9

HIGH SPEED VARIABLE SIZE TOASTER

This Application claims the benefit of U.S. Provisional Application No. 60/147,119, filed Aug. 4, 1999.

BACKGROUND OF THE INVENTION

1. Field of the Invention

This invention relates to a cooking appliance, and, in particular, to a cooking appliance that is capable of rapidly toasting bread products, such as muffins, bagels and the like. The cooking appliance is also capable of heating other food products, such as, meats, vegetables and/or garnishes.

2. Description of the Prior Art

In the fast food industry, there is an on going need for high quality toasting of bread products with faster cooking times. One type of prior art toaster used in the fast food industry is a contact toaster. An example of a contact toaster is shown in U.S. patent application Ser. No. 09/257,149, filed on Feb. 24, 1999, assigned to the same assignee as this application, now U.S. Pat. No. 5,983,785, granted Nov. 16, 1999. This patent discloses a contact toaster in which a bread product is conveyed by a conveyor belt in pressure contact with a surface of a heated stationary platen. Contact toasters generally toast only one surface of a bread product, such as the surface that is pressured against the heated platen. Such contact toasters require a relatively long time to achieve high quality toasting of a bread product, such as a bagel or muffin. Increasing the speed of the conveyor belt and increasing temperature of the platen may decrease toasting time, but could burn the food product or produce product low in temperature.

An example of a non-contact toaster is the common household toaster that uses two electrical heater elements on either side of a slot that holds the bread product. Non-contact toasters of this type toast the opposed generally flat surfaces of a bread product. Such toasters generally include a rheostat control that allows regulation of the heater element temperature so that the temperature can be increased or decreased depending on the product being toasted. For example, the temperature may be increased to obtain better and faster toasting for a thick bread product, such as a muffin or a bagel. Frequently, the temperature for a desired toasting time is so hot that the bread product burns.

Tunnel ovens that use air impingement heating are known for cooking a broad range of food products, including pizza. An example of a tunnel ovens shown in U.S. Pat. No. 4,873,107. This patent discloses a pair of oppositely rotating conveyor belts arranged to form a gap along a cooking path. Separate heated air manifolds are positioned with each conveyor belt for directed pressurized hot air on the upper and lower surfaces of a pizza item conveyed along the cooking path in the gap. A tunnel oven of this type is capable of cooking a food product at high temperature in a short time without burning. However, the cooked food product ma lack the crunchiness of a toasted food product.

Thus, there is a need for a toaster that can achieve high quality and faster toasting without burning and still provide the crunchiness of a toasted bread product.

The present invention provides a cooking appliance that meets the aforementioned need for faster toasting/cooking without burning and still providing crunchiness.

The present invention provides a cooking appliance that heats food products and garnishes.

SUMMARY OF THE INVENTION

A cooking appliance according to the present invention includes a housing having an inlet and an outlet. A toasting/cooking passageway is defined within the housing. A conveyor assembly moves food products inserted at the inlet along the toasting/cooking passageway. A heated air impingement assembly is arranged to deliver to a top surface of the food product hot air for heating the food product as well as for browning the top surface. An electrical heater is located below the passageway for delivering to a bottom surface of the food product heat and infrared energy. After toasting/cooking, the food products are delivered to the outlet.

The hot air has a temperature that rapidly heats the food product to a toasting temperature in less than 60 seconds. The hot air provides a temperature environment that facilitates the infrared heat to produce a crunchiness effect of the bottom and side surfaces of the food product by the end of the rapid toasting time.

The conveyor assembly has a conveyor belt loop that is spaced from the heated air impingement assembly by a gap. The passageway is located in the gap. An adjustment feature allows the air impingement assembly to be raised and lowered to vary its distance above the food product and thus vary the hot air velocity at the point of impingement.

Another feature is that the heated air impingement assembly and the electrical heater assembly can be structured to provide two or more toasting/cooking areas along the passageway so that different toasting/cooking temperatures and air velocities can be employed.

In alternate embodiments, the conveyor belt assembly has a pair of side by side lower belt loops that form side by side passageways with the air impingement assembly. This allows each passageway to be set for concurrent toasting/cooking of food products of different thickness. Alternatively, the passageway gaps can be the same so as to double the toasting/cooking capability of same thickness food products.

In an alternate embodiment heated impingement air is also delivered from below the food product. The electrical heating assembly is disposed relative to columns of the heated impingement air so that there is no substantial interference between the infrared energy and the impingement air.

BRIEF DESCRIPTION OF THE DRAWINGS

Other and further objects, advantages and features of the present invention will be understood by reference to the following specification in conjunction with the accompanying drawings, in which like reference characters denote like elements of structure and:

FIG. 4 is a partial view of the conveyor assembly and heating elements for the FIG. 1 cooking appliance;

FIG. 5 is an enlarged fragmentary perspective view of one of the jet curtain plates through which heated impingement air flows against food items traversing the interior of the FIG. 1 cooking appliance;

FIG. 9 is a fragmentary cross-sectional view of the fan of FIG. 4;

DESCRIPTION OF THE INVENTION

Figure 1:
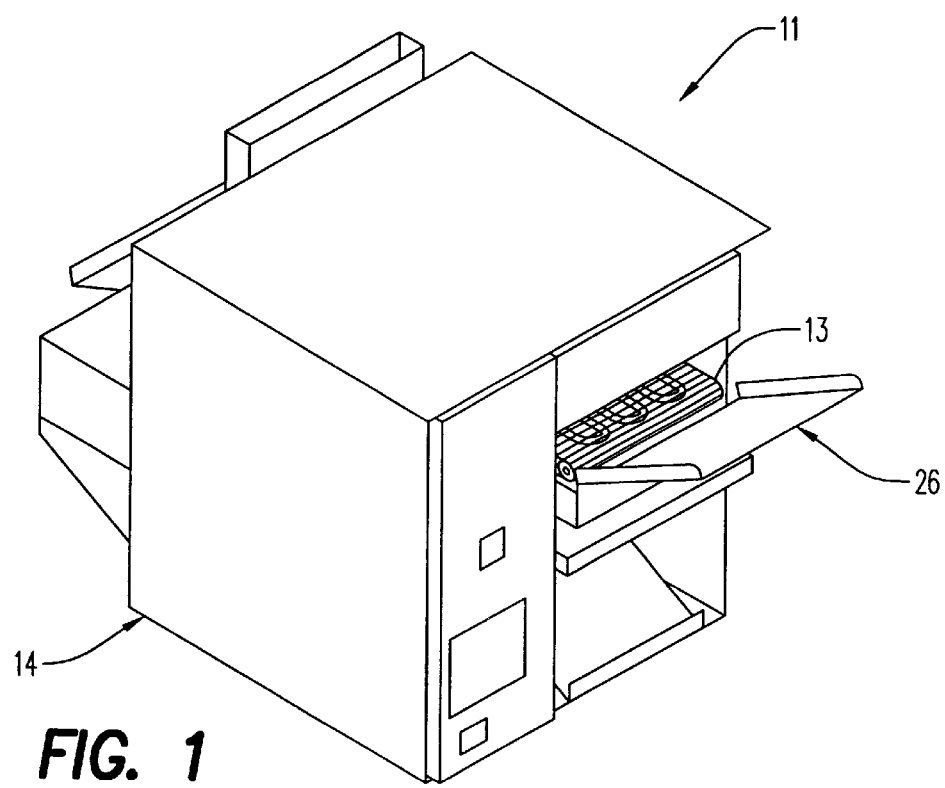
FIG. 1 is a perspective view from the food inlet side of a high speed cooking appliance according to the present invention.
Figure 2:
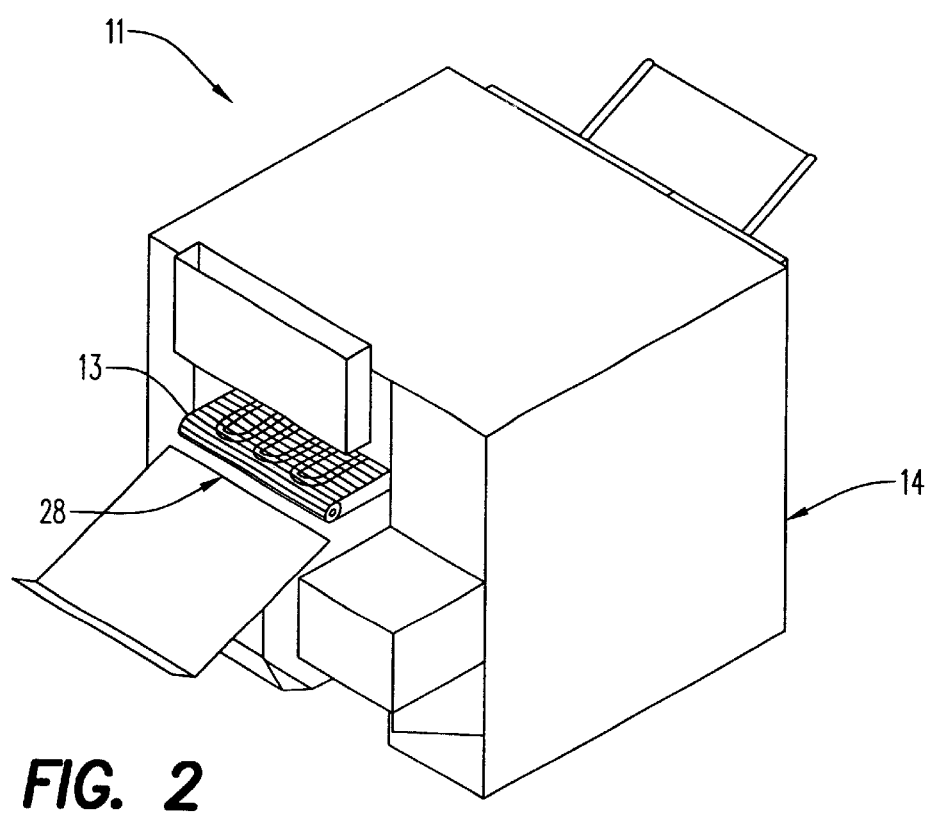
FIG. 2 is a perspective view from the food outlet side of the FIG. 1 cooking appliance.
Figure 3:
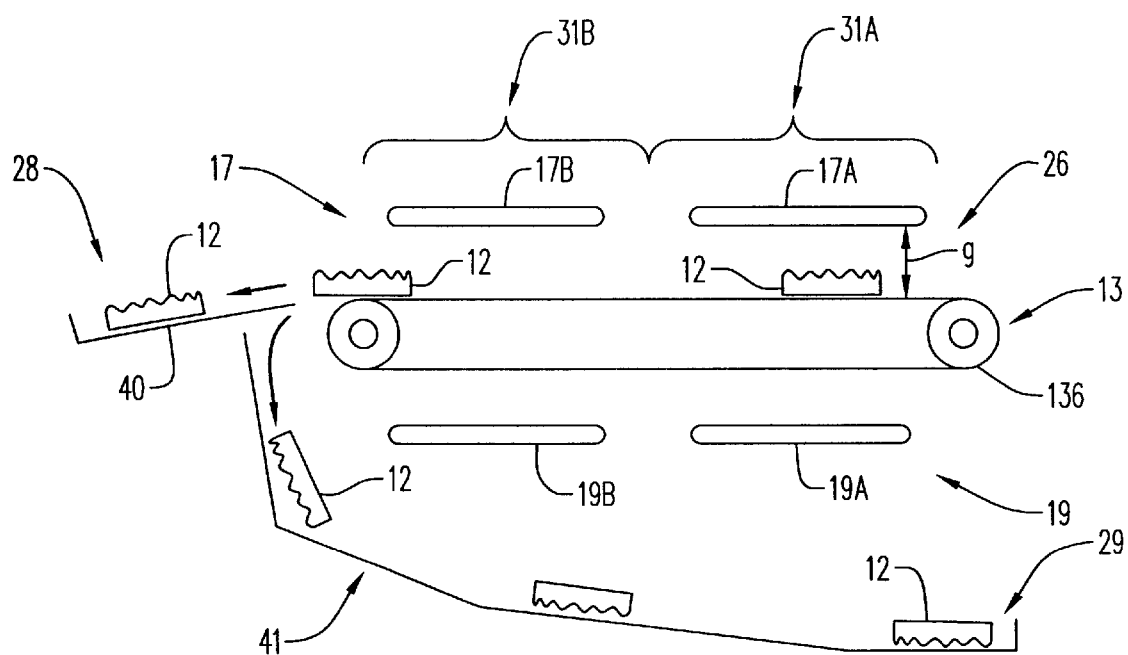
FIG. 3 is a skeletal view in elevation of the conveyor belt assembly and heating elements of the FIG. 1 cooking appliance.

With reference to FIGS. 1 through 3, there is provided a high speed cooking appliance 11 according to a preferred embodiment of the present invention. High speed cooking appliance 11 includes a housing 14, a conveyor assembly 13, an air impingement assembly 17 and an electrical heater assembly 19.

Housing 14 includes an inlet 26, an outlet 28 and an outlet 29. A food product 12 enters cooking appliance 11 via inlet 26 and is conveyed by conveyor assembly 13 to either outlet 28 or outlet 29 along a toasting/cooking passageway 30. Conveyor assembly 13 includes a conveyor belt loop 136 that rotates in the direction illustrated by the arrow in FIG. 3 to convey food products 12 along toasting/cooking passageway 30 from right to left. Food products 12 are deposited by gravity at the left end of conveyor belt loop 136 onto either a pass through chute 40 that leads to outlet 28 or onto a return chute 42 that leads to outlet 29. Pass through chute 40 is used when it is desired to have food products 12 exit via outlet 28. When it is desired to exit food products via outlet 29, pass through chute 40 is either removed or moved to a position that allows food products 12 to enter return chute 41.

Toasting/cooking passageway 30 is divided into a first toasting/cooking area 31A and a second toasting/cooking area 31B. Air impingement assembly 17 is located above conveyor belt loop 136 and has a first air impingement heater 17A and a second air impingement heater 17B. Conveyor belt loop 136 and air impingement assembly 17 are separated by a gap 'g'. Toasting/cooking passageway 30 is located in gap 'g'. Electrical heater assembly 19 has a first electrical heater element 19A and a second electrical heater element 19B located below belt loop 136 in toasting/cooking areas 31A and 31B.

An important feature of the present invention is the use of air impingement heating to rapidly heat food products 12, such as bread to a toasted temperature that corresponds to a desired heat specified by the user of the cooking appliance 11, while browning an upper surface of food products 12. For toasting bread products, the temperature of the impingement air is in the range of about 500° F. to 700° F. Most preferably, the temperature of the impingement air is about 600° to achieve a toasting time of less than 60 seconds.

To give a crunchiness to food product 12, electrical heaters 19A and 19B are operated at a temperature that produces infrared radiation to be incident on the lower surface and side surface of food product 12. It has been observed that for the environment created by the above noted air impingement temperatures, crunchiness is achieved by the end of the toasting time with infrared heating temperatures in the range of 1,000° F. to 1,800° F.

The division of toasting/cooking passageway 30 into separate toasting/cooking areas allows the flexibility of using the same or different toasting/cooking temperatures in toasting/booking areas 31A and 31B. For example, if food product 12 is frozen or cooled, the temperature of toasting/cooking area 31A can be set high to rapidly thaw and bring food product 12 to a warm but not toasted temperature during its traverse of zone 31A. The temperature of zone 31B can be set somewhat lower to finish heating food product 12. On the other hand, some applications may use substantially equal temperatures in zones 31A and 31B.

Referring to FIG. 4, housing 14 also includes an internal framing structure 16 of which only a portion is shown that corresponds to toasting/cooking area 31B. Internal framing structure 16 includes upper and lower horizontally extending rectangular frame portions 18 and 20 that are vertically spaced apart by vertically extending frame elements 22, 24, 30 and 32 are shown. A vertically disposed rectangular frame portion 36 is located within and secured at its corners to upper and lower rectangular frame portions 18 and 20. An intermediate vertically extending frame element 38 is also secured to rectangular frame portion 36. Internal framing structure is secured to the exterior walls of housing 14 in any suitable manner.

Air impingement heater 17B includes a supply duct assembly or plenum 70 that is positioned slightly above outlet 28. Supply duct assembly 70 includes an inlet or base portion 78 that is positioned generally between the housing vertical frame portion 36 and a vertical frame portion 35 of the rectangular frame formed by frame portions 18 and 20. Base portion 78 extends parallel to the toasting/cooking passageway. Supply duct assembly 70 also includes three supply ducts or jet fingers 80 joined to base portion 78 for ducting air supplied via base portion 78. Base portion 78 and jet fingers 80 have generally rectangular cross-sections.

Referring to FIG. 5, each of the jet fingers 80 has a bottom surface 82 that faces passageway 28. Each of the bottom surfaces 82 has, along its length, a corrugated cross-section defined by alternating series of generally V-shaped ridges 84 and 86 that extend parallel to the lengths of jet fingers 80. Ridges 84 project downwardly toward passageway 28. A plurality of generally rectangular shaped air slot openings 88 are formed in the apex of each ridge 84.

Figure 6:
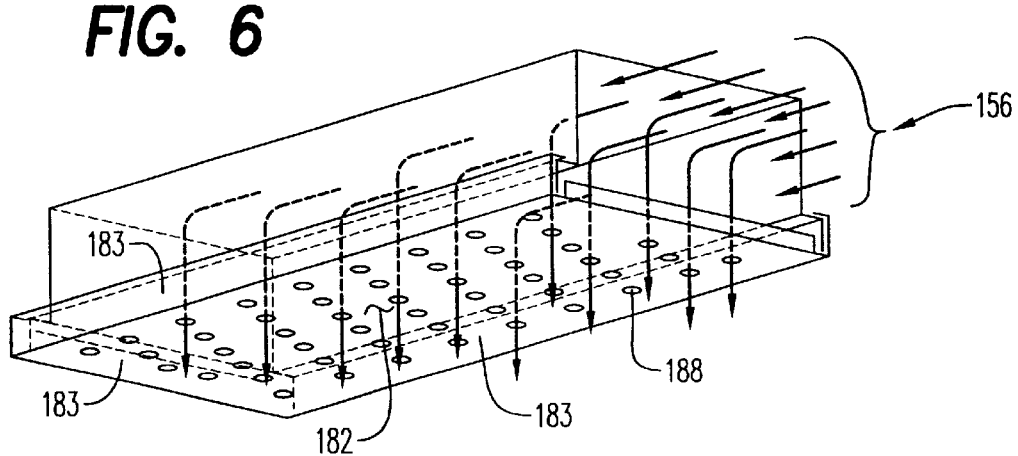
FIG. 6 is a perspective view of an alternate embodiment of the jet curtain plate.
Figure 7:
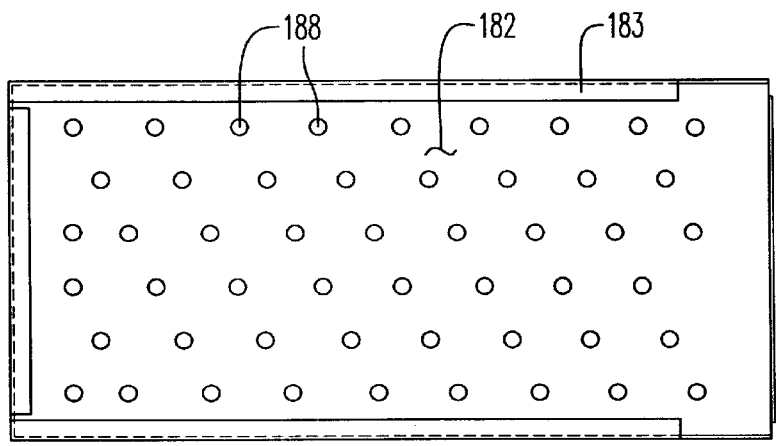
FIG. 7 is a plan view of the jet curtain plate of FIG. 6.

Referring to FIGS. 6 and 7, each of the jet fingers 80 in an alternate embodiment has a generally flat bottom surface 182 with a plurality of side wall tabs 183 for attachment to a jet finger 80. A plurality of generally circular apertures 188 is formed in bottom surface 182 to direct air 156 as impingement air toward food products 12 (not shown in FIGS. 6 and 7). Apertures 188 are arranged in an array that includes diagonal rows of apertures 188.

Figure 8:
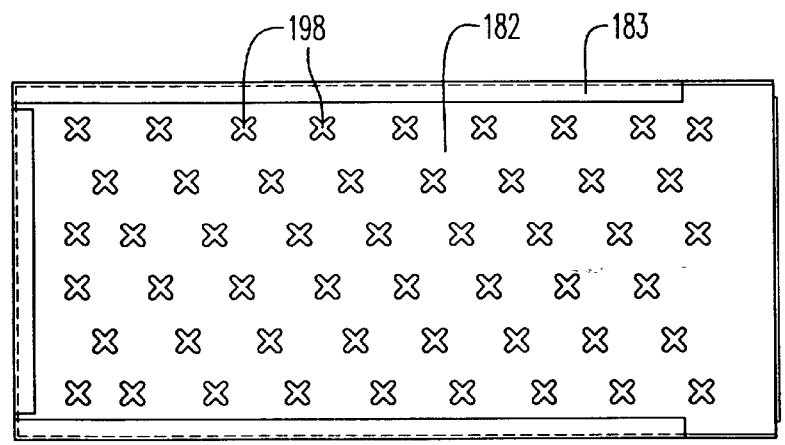
FIG. 8 is a plan view of another alternate embodiment of the jet curtain plate.

Referring to FIG. 8, bottom surface 182 has formed therein a plurality of multiple point shaped apertures 198 that have three or more points according to another alternate embodiment of the invention. Preferably, apertures 198 have four points or a cruciform shape as shown in FIG. 8. Preferably, apertures 198 are formed, as by a punch operation, such that the cruciform points extend generally downward from bottom surface 182 toward food products 12. This configuration has been found to give improved air impingement flow.

Duct assembly 70 is supported within housing 14 for selective vertical movement relative thereto by a pair of rack members 92. Rack members 92 are secured to the outer jet finger 80a and a pair of cooperating pinion gears 94 that are operatively mounted on vertical frame elements 22, 30, 36 and 38 by suitable support brackets 96. Pinion gears 94 for each jet finger 80a, are operatively connected by elongated drive shafts 98 that extend parallel to jet fingers 80a. Drive shafts 98 are rotated to selectively raise or lower duct assembly 70 to thereby selectively change the gap 'g'. Alternatively, conveyor belt assembly 13 can be raised or lowered to change the gap 'g'.

Referring to FIGS. 4 and 9, heated cooking air from within housing 14 is supplied to plenum duct assembly 70 by a fan 106 mounted within housing 14. Fan 106 has an opening 114 that faces the interior of housing 14, an electrical heating coil 116, a drive shaft 118 extending outwardly through an adjacent wall 119 of housing 14 and a motor 120, suitably secured to wall 119. An outlet duct 126 extends vertically from fan 106 and is slidably and telescopically received in a supply duct section 130 that in turn is secured to base portion duct 78 by mounting bracket 132. This construction allows duct assembly 70 to freely move vertically when drive shafts 98 are rotated. Electrical heating coil 116 serves to heat air 156. Heating coil 116 may be located downstream of fan opening 114 as shown in FIG. 9 or in any other position that heats air 156.

Conveyor belt loop 136 includes a pair of looped roller chains 138 and 140 that extend transversely to jet fingers 80 and 80*a*. Outer end portions of conveyor belt loop 136 are rotatably supported at corner portions thereof by suitable sprockets 142 that operatively engage roller chains 138 and 140. Sprockets 142 are secured to housing 14 by mounting brackets 144.

Laterally opposed sprockets 142 are interconnected by suitable connecting rods 146. At least one connecting rod 146 is rearwardly extended to define a drive shaft 146*a*. Drive shaft 146*a* may suitably be driven (by a conventional drive, not shown) to rotate belt loop 136 in the direction indicated by the arrow to horizontally convey food product 12 along passageway 30 (FIG. 3).

Conveyor belt loop 136 include a series of individual transverse sections 150 that are operatively secured between roller chains 138 and 140 for movement therewith.

Referring to FIGS. 3 through 9, supply fan 106 draws air 156 (FIG. 9) from within housing 14 into opening 114 across heating element 116. Heated air entering fan 106 is forced upwardly into base duct portion 78 and through jet fingers 80 and 80*a* and then exits via air slots 88 downwardly toward passageway 30. The rectangularly cross-sectioned jets of hot air impinge upon conveyor belt loop 136 and upon food products 12 in passageway 30 to thereby heat food product 12 and brown its upper surface. After impinging on food product 12, the air continues in a recirculating path to fan opening 114 via heating element 116.

Electrical heater 19B is shown in FIG. 4 as an electrical heating coil that has a serpentine coil pattern, although any shape or type of infrared heating element capable of imparting the desired crunchiness to the food product is also contemplated by the present invention. Electrical heaters 19A and 19B may be separate coils with separate temperature regulators or may be a combined coil that extends across both toasting/cooking areas 31A and 31B with one temperature regulator. As previously mentioned, electrical heaters 19A and 19B are heated to a temperature that produces infrared radiation. The infrared radiation acts in the heated environment produced by hot air impingement assembly 17 to toast the bottom and side surfaces of food product 12 to the desired crunchiness.

Figure 10:
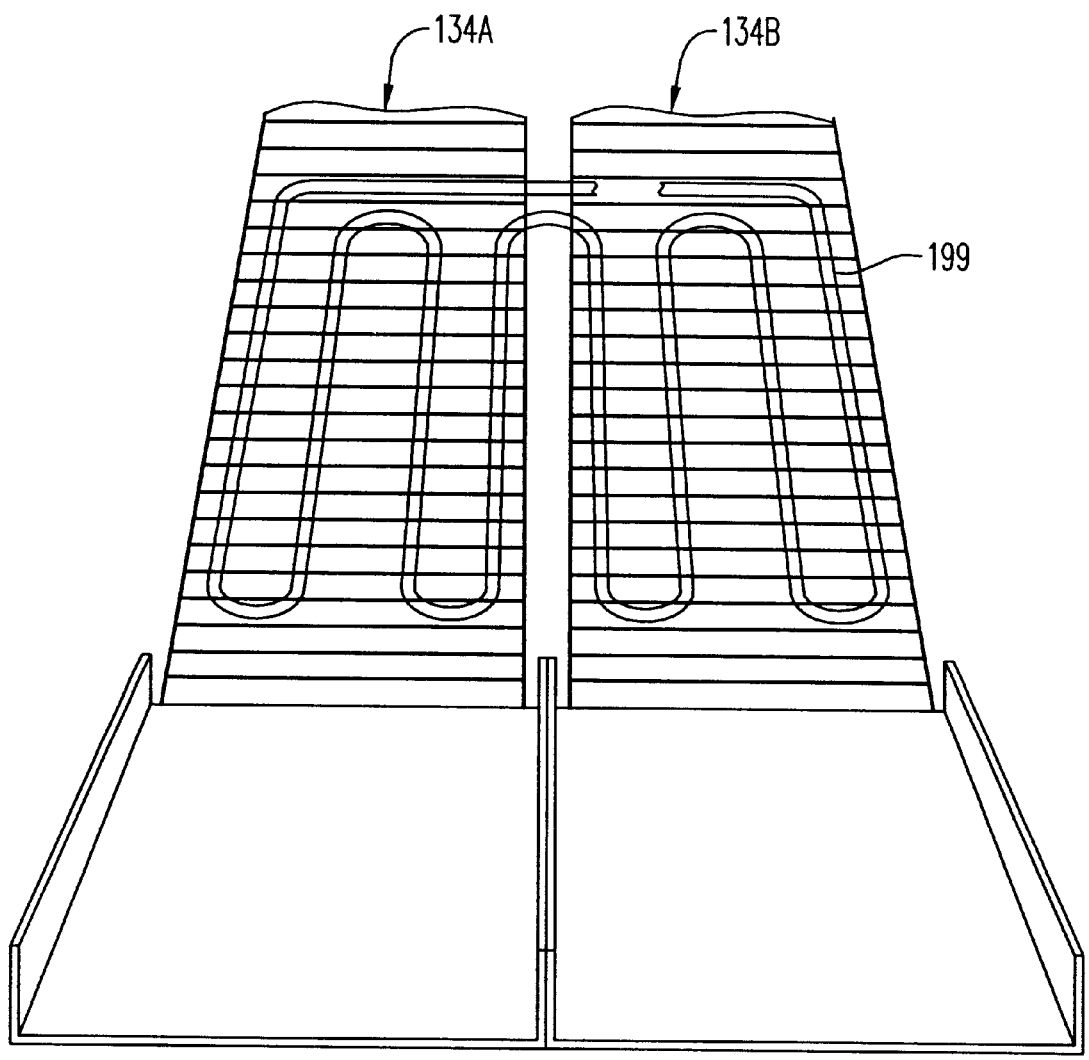
FIG. 10 is a perspective view of an alternate embodiment that has twin conveyor belts.

Referring to FIG. 10, an alternate embodiment of the present invention has a pair of conveyor belt loops 134A and 134B. Each lower belt loop 134A and 134B is situated beneath upper belt loop 136 to form separate toasting/cooking passageways for the conveyance of food products 12. A single heater coil 199 is used for both lower belt loops 134A and 134B. The gap 'g' of each passageway may be separately adjusted so that food products of the same or different thickness can be concurrently cooked or toasted. For example, both passageways can be set to the same gap so as to double the number of food items of the same thickness that can be cooked or toasted. Alternatively, one passageway can be set to a gap 'g' that accommodates the heel of a muffin and the other to a gap 'g' that accommodates the crown of a muffin. Additionally, air impingement assembly 17 can be extended to cover both passageways in each toasting/cooking area. Alternatively, separate air impingement assemblies can be used for each passageway and toasting/cooking area.

The distance between electrical heating assembly 19 and conveyor belt loop 136 may be adjustable to vary the intensity of the heat and infrared energy incident on the food products 12. In some embodiments, heating assembly 19 may be located within conveyor belt loop 136.

In still other embodiments of the present invention, air impingement assembly 17 can be located in other positions that can deliver impingement air to food products 12. For example, air impingement assembly 17 can be located anywhere in housing 14 with an impingement air delivery ductwork that provides impingement air to food products 12.

In some embodiments, conveyor belt assembly 13 may be vertically adjustable to vary the gap "g".

Figure 11:
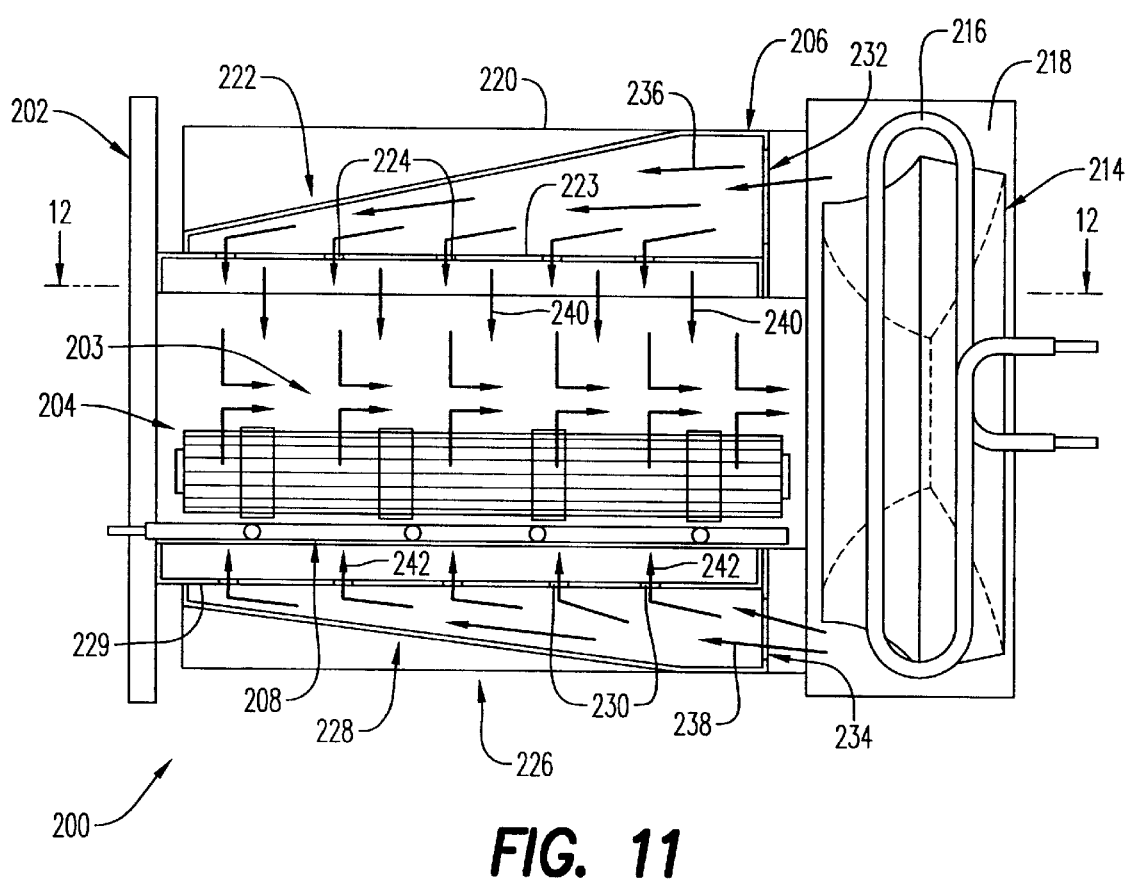
FIG. 11 is front view with front cover removed of an alternate embodiment of the high speed cooking appliance of the present invention.
Figure 12:
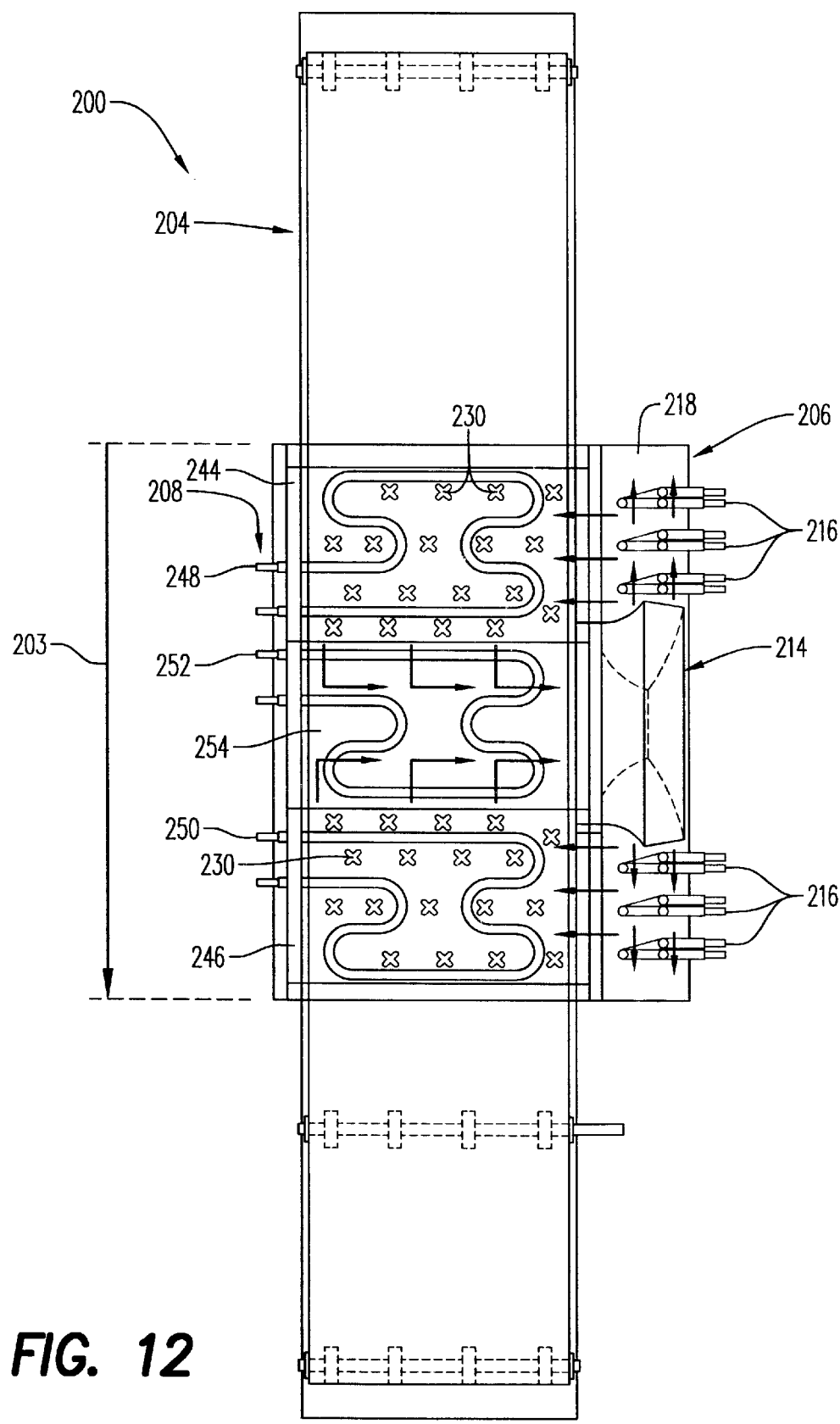
FIG. 12 is view taken along line 12—12 of FIG. 11.

Referring to FIGS. 11 and 12, an alternate embodiment of the present invention is shown as a high speed cooking appliance 200. High speed cooking appliance 200 includes a housing 202, a conveyor assembly 204, an air impingement assembly 206 and an electrical heater assembly 208. Housing 202 defines a toasting/cooking passageway 203 located above conveyor assembly 204. Conveyor assembly 204 rotates to convey food products (not shown) on one or more conveyor belts (not shown) along toasting/cooking path 203. Air impingement assembly 206 includes an upper air plenum 220, a lower air plenum 226, a fan 214, air heaters 216 and an air plenum 218. Upper air plenum 220 has a distribution ramp 222, a bottom surface 223 and a plurality of apertures 224 formed in bottom surface 223. Lower air plenum 226 that has a distribution ramp 228, a top surface 229 and a plurality of apertures 230 formed in top surface 229.

When fan 214 rotates, an airflow is generated in air plenum 218 that is heated by air heaters 216. The heated air flows from air plenum 218 via a slot 232 into upper air plenum 220 and a slot 234 into lower air plenum 226 as indicated by arrows 236 and 238, respectively. The heated airflow in upper air plenum 218 is deflected by ramp 222 to flow downwardly through apertures 224 as indicated by arrows 240 toward the top of conveyor assembly 204 and into toasting/cooking passageway 203. The heated airflow in lower a plenum 226 is deflected upwardly by ramp 228 through apertures 230 as indicated by arrows 242 toward the bottom of and through conveyor assembly 204 into toasting/cooking passageway 203.

Upper air plenum 218 may suitably be a single jet finger that has a length substantially along toasting/cooking passageway 203. Alternatively upper air plenum 218 may be a plurality of jet fingers. Preferably, apertures 224 have a cruciform shape.

Referring to FIG. 12, lower air plenum 226 has a jet finger 244 located at one end of toasting/cooking passageway 203 and another jet finger 246 located at the other end of toasting/cooking passageway 203. Apertures 230 are disposed in the tops of jet fingers 244 and 246 and preferably have a cruciform shape.

Electrical heater 208 includes a heater element 248 disposed above jet finger 244, a heater element 250 disposed above jet finger 246 and a heater element 252 disposed above a space 254 located between jet fingers 244 and 246. Heater elements 248, 250 and 252 are infrared heaters that are each formed in a serpentine pattern. The serpentine patterns of heater elements 248 and 250 are arranged to wind about apertures 230, but to avoid overlying apertures 230. This arrangement permits infrared energy emitted by heater elements 248 and 250 and convection energy of air impingement columns flowing upwardly from apertures 230 to have minimal interference with one another. That is, the heater elements do not impede the air flow and the air flow does not reduce the infrared emissions by cooling the heating elements.

Cooking appliance 200 provides a cooking environment that is extremely hot from above and below toasting/cooking passageway 203, while gaining the benefit of added crunchiness afforded by infrared heating assembly 208. By using three different heater elements 248, 250 and 252 and spaced lower jet fingers 244 and 246, three distinct cooking zones are defined that can be controlled for heating temperatures and food product resident times within each zone. This affords great flexibility in the toasting/cooking process.

The present invention having been thus described with particular reference to the preferred forms thereof, it will be obvious that various changes and modifications may be made therein without departing from the spirit and scope of the present invention as defined in the appended claims.

What is claimed is:

1. A cooking device which comprises:
   an air impingement assembly which is capable of contacting a food product with heated air from above;
   a housing having an inlet and an outlet, wherein a passageway is disposed therebetween for movement of a food product from said inlet to said outlet;
   a means for moving said food product along said passageway, wherein said passageway has first and second toasting areas along the direction of said passageway between said inlet and said outlet, and wherein said air impingement assembly has a first air delivery plenum located in said first area and a second air delivery plenum located in said second area; and
   a heater assembly, which is located below said food product and which is capable of imparting a desired amount of crunchiness to said food product, wherein said air impingement assembly includes means for separately adjusting the distance between said first and second air delivery plenums and said passageway so as to vary the temperature of the heating air in each of first and second cooking zones.

2. The cooking device of claim 1, further comprising a second passageway disposed adjacent to said passageway, whereby additional food products can be cooked in said second passageway concurrent with said food product in said passageway.

3. A cooking device which comprises:
   an air impingement assembly which is capable of contacting a food product with heated air from above; and
   a heater assembly, which is located below said food product and which is capable of imparting a desired amount of crunchiness to said food product, wherein said air impingement assembly includes a plate having a plurality of apertures that direct said heated air toward said food product, said apertures having three or more points that extend generally from said plate toward said food product.

4. The cooking device of claim 3, wherein each of said apertures has a cruciform shape.

5. The cooking device of claim 3, wherein said heater assembly comprises an infrared heating element that emits infrared energy so as to impart said crunchiness to said food product.

6. The cooking device of claim 3, wherein said air impingement assembly is also capable contacting said food product with heated air from below.

7. The cooking device of claim 6, wherein said air impingement assembly includes an upper air plenum that is disposed above said passageway and that delivers said heated air from above and a lower air plenum that is disposed below said passageway and that delivers said heated air from below.

8. A cooking device comprising:
   an air impingement assembly including an upper air plenum that is disposed above a passageway and that provides heated air from above to a food product disposed in said passageway and a lower air plenum that provides heated air from below to said food product; and
   a heater assembly that is located below said food product and that provides radiant energy to said food product from below, wherein said lower air plenum includes a surface having a plurality of apertures through which said heated air from below is delivered, wherein said heater assembly includes a heating element disposed relative to said apertures in a manner to have minimal interference between said radiant energy and said heated air from below and wherein said heater element is arranged in a winding pattern that does not overlie any of said apertures.

9. The cooking device of claim 8, wherein said heater assembly emits infrared energy.

10. The cooking device of claim 8, wherein said winding pattern is serpentine.

11. A cooking device comprising:
    an air impingement assembly that provides columns of heated air to a food product, wherein said air impingement assembly includes a surface with a plurality of apertures through which said columns of air are delivered, and wherein said heater element does not overlie any of said apertures; and
    a heater assembly that provides radiant energy to said food product, that includes a heater element that emits said radiant energy, said heater element being arranged in a winding pattern that does not overlie any of said apertures so as to weave about said columns of air without being directly within said columns of air.

12. The cooking device of claim 11, wherein said air impingement assembly is disposed to provide said columns of heated air to said food product from a direction selected from the group consisting of; above and above and below.

13. The cooking device of claim 11, wherein said food product has a top surface and a bottom surface, wherein said air impingement assembly is disposed to provide said columns of heated air to either or both of said top and bottom surfaces, and wherein said heater assembly is disposed so that said radiant energy is provided to one of said top and bottom surfaces of said food product.

14. The cooking device of claim 11, wherein said radiant energy is infrared energy.

15. The cooking device of claim 11, further comprising:
a conveyor assembly for moving said food product by said air impingement assembly and said heater assembly.

16. The cooking device of claim 15, wherein said air impingement assembly includes a first plenum that provides said columns of heated air, wherein said food product has a first surface, and wherein said first plenum and said heater element are disposed to provide said columns of heated air and said radiant energy to said first surface.

17. The cooking device of claim 15, wherein said air impingement assembly includes first and second air delivery plenums disposed to provide first and second cooking areas, respectively, along a direction of movement of said food product by said conveyor assembly.

18. The cooking device of claim 17, further comprising:
means for adjusting a distance between at least one of said first and second air delivery plenums and a conveyor surface of said conveyor assembly.

19. The cooking device of claim 11, further comprising:
a height adjuster for adjusting a distance between a surface of said food product and said air impingement assembly.

* * * * *